United States Patent
Zhang

(10) Patent No.: US 10,348,629 B2
(45) Date of Patent: Jul. 9, 2019

(54) METHOD AND DEVICE FOR PROCESSING WIRELESS BASEBAND CAPABLE OF EXPANDING DYNAMICALLY

(71) Applicant: ZTE MICROELECTRONICS TECHNOLOGY CO., LTD, Shenzhen (CN)

(72) Inventor: Linsheng Zhang, Shenzhen (CN)

(73) Assignee: SANECHIPS TECHNOLOGY CO., LTD., Guangdong (CN)

(*) Notice: Subject to any disclaimer, the term of this patent is extended or adjusted under 35 U.S.C. 154(b) by 406 days.

(21) Appl. No.: 15/029,418

(22) PCT Filed: May 13, 2014

(86) PCT No.: PCT/CN2014/077377
§ 371 (c)(1),
(2) Date: Aug. 15, 2016

(87) PCT Pub. No.: WO2014/187253
PCT Pub. Date: Nov. 27, 2014

(65) Prior Publication Data
US 2016/0359748 A1 Dec. 8, 2016

(30) Foreign Application Priority Data
Oct. 17, 2013 (CN) .......................... 2013 1 0486363

(51) Int. Cl.
*G06F 15/173* (2006.01)
*H04L 12/803* (2013.01)
(Continued)

(52) U.S. Cl.
CPC .......... *H04L 47/125* (2013.01); *G06F 9/5083* (2013.01); *H04L 25/00* (2013.01); *H04W 84/042* (2013.01); *H04W 88/08* (2013.01)

(58) Field of Classification Search
CPC ..... H04L 47/125; H04L 25/00; H04L 12/803; G06F 9/5083; G06F 9/50; G06F 9/5061; H04W 88/08; H04W 84/042; Y02D 70/00
See application file for complete search history.

(56) References Cited

U.S. PATENT DOCUMENTS

2004/0208166 A1* 10/2004 Trabelsi ................ H04L 47/125
370/352
2006/0090161 A1 4/2006 Bodas
(Continued)

FOREIGN PATENT DOCUMENTS

CN 101730314 A 6/2010
CN 102300221 A 12/2011
(Continued)

OTHER PUBLICATIONS

European Search Report for corresponding application EP14801894; dated Oct. 14, 2016.
(Continued)

Primary Examiner — Benjamin M Thieu
(74) Attorney, Agent, or Firm — Cantor Colburn LLP

(57) ABSTRACT

A method and device for processing a wireless baseband capable of expanding dynamically are provided. The method includes the following steps: a plurality of groups of wireless baseband processing clusters which have different processing capacities and are relatively independent are pre-constructed (S201); a current load working state of each group of wireless baseband processing clusters is acquired by monitoring the processing loads of the plurality of groups of wireless baseband processing clusters (S202); and according to baseband processing task requirements and the current load working state of each group of wireless baseband processing clusters, a certain number of wireless baseband processing clusters of which the current load working states are suitable for performing a baseband processing task are (Continued)

scheduled to enter a working state for performing the wireless baseband processing task (S203).

10 Claims, 3 Drawing Sheets

(51) Int. Cl.
    *H04L 25/00*     (2006.01)
    *G06F 9/50*     (2006.01)
    *H04W 84/04*     (2009.01)
    *H04W 88/08*     (2009.01)

(56) References Cited

U.S. PATENT DOCUMENTS

| | | | | |
|---|---|---|---|---|
| 2007/0254671 | A1* | 11/2007 | Liu | H04W 88/08 455/446 |
| 2012/0040684 | A1* | 2/2012 | Gao | H04W 28/08 455/453 |
| 2012/0129517 | A1* | 5/2012 | Fox | H04L 41/5025 455/425 |
| 2013/0070688 | A1* | 3/2013 | Picker | H04W 88/08 370/329 |
| 2014/0029431 | A1* | 1/2014 | Haberland | H04W 88/08 370/235 |
| 2014/0328178 | A1* | 11/2014 | Haberland | H04W 28/08 370/235 |
| 2015/0063373 | A1* | 3/2015 | Savaglio | H04W 88/08 370/466 |
| 2015/0341206 | A1* | 11/2015 | Derakhshan | H04L 45/028 709/221 |
| 2016/0227535 | A1* | 8/2016 | Sharma | H04W 72/0453 |

FOREIGN PATENT DOCUMENTS

| | | | | | |
|---|---|---|---|---|---|
| CN | 102421122 | A | * | 4/2012 | |
| CN | 102622208 | A | | 8/2012 | |
| CN | 102740326 | A | | 10/2012 | |
| CN | 102740326 | B | * | 2/2015 | |
| CN | 102622208 | B | * | 6/2015 | G06F 9/5061 |
| JP | 2007134840 | A | | 5/2007 | |
| JP | 2012085155 | A | | 4/2012 | |
| KR | 20030080009 | A | | 10/2003 | |
| WO | 2013123670 | A1 | | 8/2013 | |

OTHER PUBLICATIONS

International Search Report for corresponding application No. PCT/CN2014/077377 filed on May 13, 2014; dated Sep. 17, 2014.

* cited by examiner

METHOD AND DEVICE FOR PROCESSING WIRELESS BASEBAND CAPABLE OF EXPANDING DYNAMICALLY

TECHNICAL FIELD

The present disclosure relates to the field of information technology, particularly to a method and device for processing a wireless baseband capable of expanding dynamically.

BACKGROUND

The same mechanism, in which a cellular base station covers mobile terminal users in a certain area coverage, is applied by wireless communications of the First Generation (1G)/Second Generation (2G)/Third Generation (3G)/Fourth Generation (4G). When an area (such as a gymnasium and a conference center) is a hotspot area, or there are a plurality of mobile terminals (there are multiple personal handheld Internet devices), problems including a call drop, a busy network or even an access failure and so on may be caused if a base station is insufficient in processing capability or bandwidth. In other words, this is a scenario in which the processing capability of the base station needs to satisfy the maximum working load of the covered area. However, hotspot areas are changing with changes of time and human activities.

With the explosive growth of 3G/4G wireless communications services, users and operators also demand for increasing base station processing capabilities. Currently, a common solution is that a wireless baseband processing board is added to a place with insufficient base station processing capability, or a baseband chip is upgraded to have stronger processing capability. However, investment and maintenance and power consumption of devices are extremely high in either solution.

Internal system working clocks, bus bandwidth, and resource power consumption of most baseband chips are overdesigned so as to satisfy scenarios with maximum working loads, and the baseband chips usually work at peaks (or in a small number of phases). In other words, there are multiple extraordinarily powerful Central Processing Units (CPU), multiple extraordinarily powerful Digital Signal Processing (DSP), multiple extraordinarily powerful accelerators, multiple memories with ultra-large capacities, and multiple internetworking of ultra-large bandwidth. FIG. 1 shows a rough simplified development route of a piece of wireless baseband chip architecture.

SUMMARY

Embodiments of the present disclosure aim to provide a method and device for processing a wireless baseband capable of expanding dynamically, thereby solving problems in the traditional art that development of an extraordinarily powerful processing unit/a memory having a ultra-large capacity/a piece of architecture with ultra-large bandwidth is unsustainable, and excessive capabilities of baseband processing are wasted in order to satisfy extreme working scenarios due to increasing difference in demands on wireless baseband processing capabilities in common working scenarios and the extreme working scenarios.

A method for processing a wireless baseband capable of expanding dynamically is provided according to an embodiment of the present disclosure, including the following steps:

a plurality of groups of wireless baseband processing clusters which have different processing capacities and are relatively independent are pre-constructed;

a current load working state of each group of wireless baseband processing clusters is acquired by monitoring the processing loads of the plurality of groups of wireless baseband processing clusters; and according to baseband processing task requirements and the current load working state of each group of wireless baseband processing clusters, a certain number of wireless baseband processing clusters of which the current load working states are suitable for performing a baseband processing task are to are scheduled enter a working state for performing the wireless baseband processing task.

Preferably, the method may further include that: other wireless baseband processing clusters not carrying the wireless baseband processing task are scheduled to exit the working state.

Preferably, the wireless baseband processing clusters may include: wireless baseband processing clusters subordinate to group categories of wireless baseband processing clusters, and a preset number of wireless baseband processing clusters selected from each group category.

Preferably, that a certain number of wireless baseband processing clusters of which the current load working states are suitable for performing the baseband processing task are scheduled to enter the working state may include that:

the group categories of wireless baseband processing clusters, and the number thereof are determined according to the baseband processing task requirements;

the wireless baseband processing clusters of which working states are suitable for performing the baseband processing task are selected from all wireless baseband processing clusters of the determined categories of wireless baseband processing clusters according to the current load working state of each wireless baseband processing cluster; and the selected wireless baseband processing clusters are scheduled to enter the working state.

Preferably, the group categories of wireless baseband processing clusters, and the number of wireless baseband processing clusters in each group category may be determined according to analysis/modeling and simulation of different applications.

A device for processing a wireless baseband capable of expanding dynamically is provided according to another embodiment of the present disclosure, including:

a wireless baseband processing cluster constructing component, configured to pre-construct a plurality of groups of wireless baseband processing clusters which have different processing capacities and are relatively independent;

a current load working state acquiring component, configured to acquire a current load working state of each group of wireless baseband processing clusters by monitoring the processing loads of the plurality of groups of wireless baseband processing clusters; and a wireless baseband processing cluster working scheduling component configured to schedule, according to baseband processing task requirements and the current load working state of each group of wireless baseband processing clusters, a certain number of wireless baseband processing clusters of which the current load working states are suitable for performing a baseband processing task to enter a working state for performing the wireless baseband processing task.

Preferably, the processing device may further include:

a wireless baseband processing cluster working exit scheduling component, configured to schedule other wireless baseband processing clusters not carrying the wireless baseband processing task to exit the working state.

Preferably, the wireless baseband processing clusters in the wireless baseband processing cluster constructing component may include: group categories of wireless baseband processing clusters, and the number of the wireless baseband processing clusters in each group category.

Preferably, the wireless baseband processing cluster working scheduling component may include:

a determining unit, configured to determine the group categories of wireless baseband processing clusters, and the number thereof according to the baseband processing task requirements;

a selecting unit configured to select, according to the current load working state of each wireless baseband processing cluster, the wireless baseband processing clusters of which working states are suitable for performing the baseband processing task from all wireless baseband processing clusters of the determined categories of wireless baseband processing clusters; and a scheduling unit, configured to schedule the selected wireless baseband processing clusters to enter the working state.

Preferably, the wireless baseband processing cluster constructing component may be configured to determine the group categories of wireless baseband processing clusters, and the number of wireless baseband processing clusters in each group category according to analysis/modeling and simulation of different applications.

Compared with the traditional art, the present disclosure has the following beneficial effect:

the embodiments of the present disclosure put forward a new further developing idea for a piece of wireless baseband processing architecture, and are able to distribute the wireless baseband processing clusters with processing capacities as required, reduce the power consumption of a system, and protect the environment.

DETAILED DESCRIPTION OF THE EMBODIMENTS

Preferred embodiments of the present disclosure will be expounded hereinafter with reference to the accompanying drawings. It should be understood that the preferred embodiments described below are only used for describing and explaining the present disclosure, instead of limiting the present disclosure.

Figure 1:
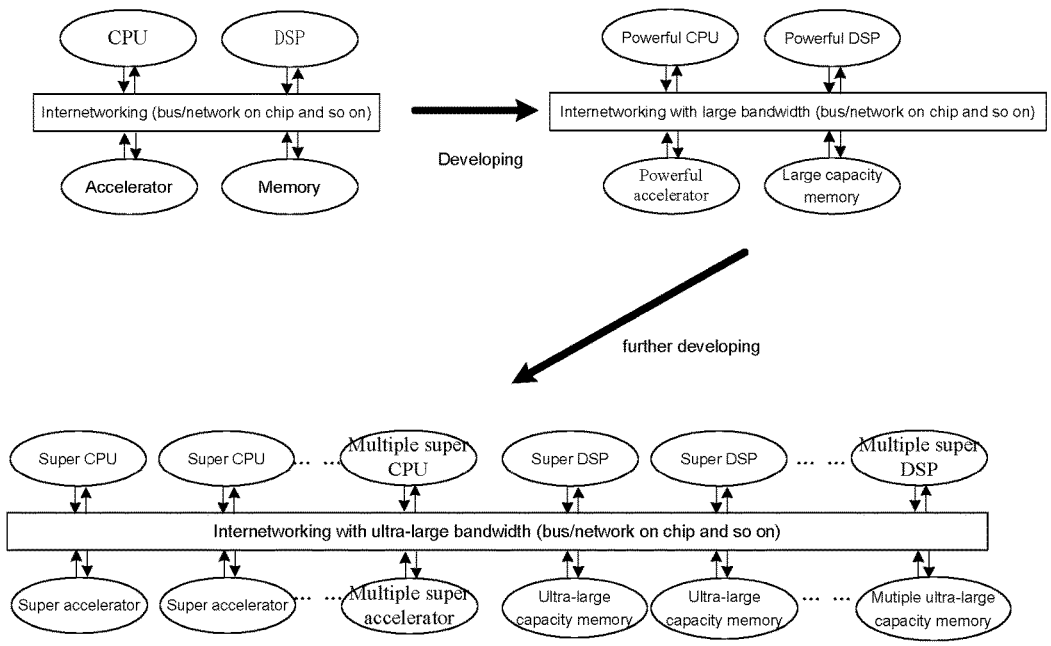
FIG. 1 is a diagram of a rough simplified development route of a piece of wireless baseband chip architecture.
Figure 2:
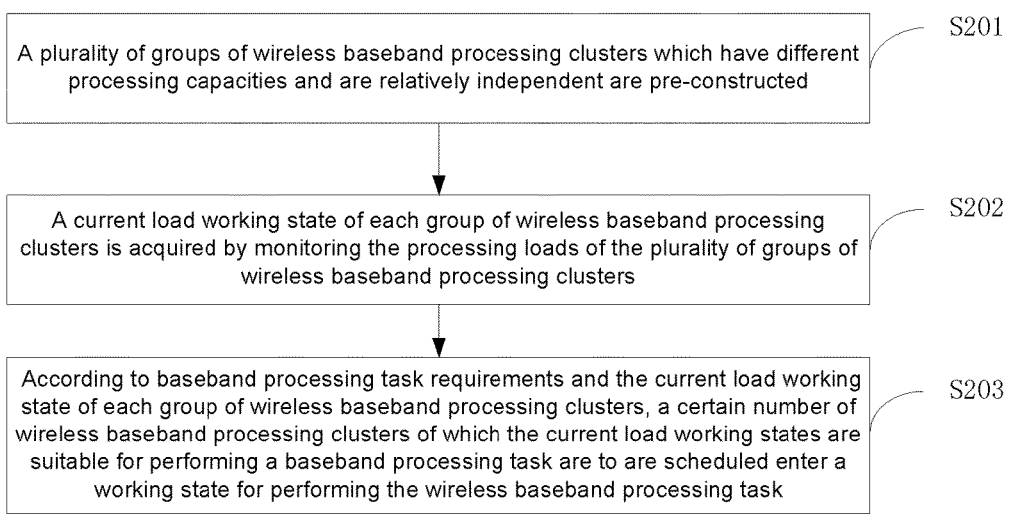
FIG. 2 is a flowchart of a method for processing a wireless baseband capable of expanding dynamically according to the present disclosure.

FIG. 2 shows a flowchart of a method for processing a wireless baseband capable of expanding dynamically according to the present disclosure. As shown in FIG. 2, the method includes the following steps.

Step 201: A plurality of groups of wireless baseband processing clusters which have different processing capacities and are relatively independent are pre-constructed.

Step 202: A current load working state of each group of wireless baseband processing clusters is acquired by monitoring the processing loads of the plurality of groups of wireless baseband processing clusters.

Step 203: According to baseband processing task requirements and the current load working state of each group of wireless baseband processing clusters, a certain number of wireless baseband processing clusters of which the current load working states are suitable for performing a baseband processing task are to are scheduled enter a working state for performing the wireless baseband processing task.

The present disclosure further includes that other wireless baseband processing clusters not carrying the wireless baseband processing task are scheduled to exit the working state, wherein the wireless baseband processing clusters include: group categories of wireless baseband processing clusters, and the number of the wireless baseband processing clusters in each group category.

Specifically, that a certain number of wireless baseband processing clusters of which the current load working states are suitable for performing the baseband processing task are scheduled to enter the working state includes that: the group categories of wireless baseband processing clusters, and the number thereof are determined according to the baseband processing task requirements; the wireless baseband processing clusters of which working states are suitable for performing the baseband processing task are selected from all wireless baseband processing clusters of the determined categories of wireless baseband processing clusters according to the current load working state of each wireless baseband processing cluster; and the selected wireless baseband processing clusters are scheduled to enter the working state.

A wireless baseband processing cluster constructing component 301 of the present disclosure determines the group categories of wireless baseband processing clusters, and the number of wireless baseband processing clusters in each group category according to analysis/modeling and simulation of different applications.

Figure 3:
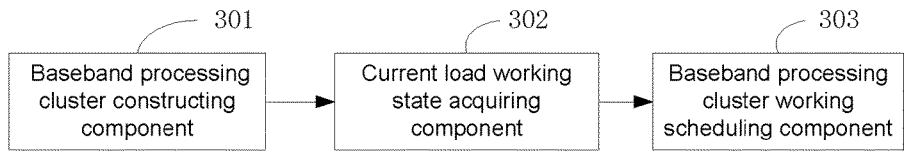
FIG. 3 is a schematic diagram of a device for processing a wireless baseband capable of expanding dynamically according to the present disclosure.

FIG. 3 shows a schematic diagram of a device for processing a wireless baseband capable of expanding dynamically according to the present disclosure. As shown in FIG. 3, the device includes: a wireless baseband processing cluster constructing component 301, configured to pre-construct a plurality of groups of wireless baseband processing clusters which have different processing capacities and are relatively independent; a current load working state acquiring component 302, configured to acquire a current load working state of each group of wireless baseband processing clusters by monitoring the processing loads of the plurality of groups of wireless baseband processing clusters; and a wireless baseband processing cluster working scheduling component 303 configured to schedule, according to baseband processing task requirements and the current load working state of each group of wireless baseband processing clusters, a certain number of wireless baseband processing clusters of which the current load working states are suitable for performing a baseband processing task to enter a working state for performing the wireless baseband processing task.

The present disclosure further includes: a wireless baseband processing cluster working exit scheduling component, configured to schedule other wireless baseband processing clusters not carrying the wireless baseband processing task to exit the working state, wherein the wireless baseband processing clusters in the wireless baseband processing cluster constructing component 301 include: group categories of wireless baseband processing clusters and the numbers of wireless baseband processing clusters in each group category.

Further, the wireless baseband processing cluster working scheduling component 303 includes: a determining unit, configured to determine the group categories of wireless baseband processing clusters, and the number thereof according to the baseband processing task requirements; a selecting unit configured to select, according to the current load working state of each wireless baseband processing cluster, the wireless baseband processing clusters of which working states are suitable for performing the baseband processing task from all wireless baseband processing clusters of the determined categories of wireless baseband processing clusters; and a scheduling unit, configured to schedule the selected wireless baseband processing clusters to enter the working state.

The group categories of wireless baseband processing clusters, and the number of wireless baseband processing clusters in each group category are determined according to analysis/modeling and simulation of different applications.

Figure 4:
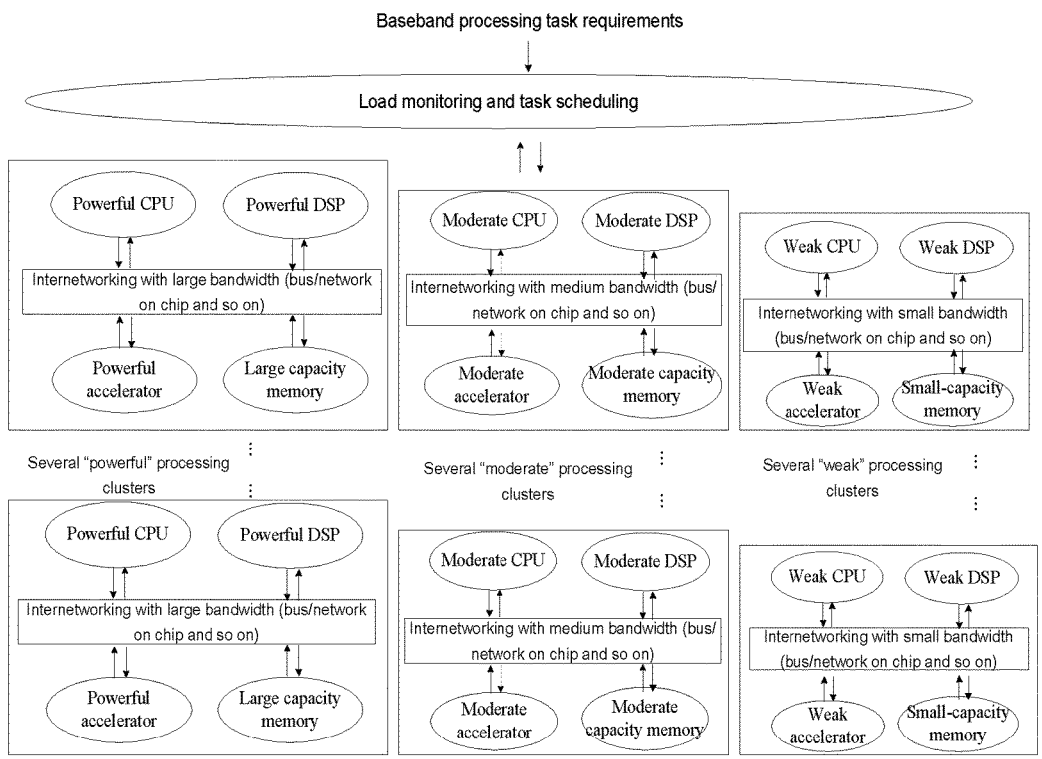
FIG. 4 is a diagram of a piece of wireless baseband processing architecture capable of expanding dynamically according to an embodiment of the present disclosure.

FIG. 4 shows a diagram of a piece of wireless baseband processing architecture capable of expanding dynamically according to an embodiment of the present disclosure. As shown in FIG. 4, "multiple extraordinarily powerful CPUs, multiple extraordinarily powerful DSPs, multiple extraordinarily powerful accelerators, multiple memories with ultra-large capacities, and multiple internetworking of ultra-large bandwidth" are converted into a piece of integral wireless baseband processing chip architecture formed by combining "large, medium and small" or "powerful, moderate and weak" components according to levels of processing capabilities to jointly form a processing cluster resource pool. Each group of wireless baseband processing clusters include group categories of wireless baseband processing clusters, and the number of wireless baseband processing clusters in each group category. The number of processing clusters in each group is determined by analyzing/modeling and simulating different applications, and each processing cluster is able to complete wireless baseband processing of some users independently and perfectly, including uplink and downlink processing (similar to an independent small chip) and so on. Besides, processing clusters are not necessarily confined in three groups consisting of a "powerful" group, a "moderate" group and a "weak" group. The number of required groups with different processing capabilities (there may be only 1 or N groups) may be determined by analyzing/modeling and simulating different applications.

A load monitoring and task scheduling component dynamically schedules and adjusts a working or power-off/dormant states of various processing clusters according to real-time requirements on baseband processing capabilities in different application scenarios, thereby matching a required combination of processing capabilities (allocation on demand), and processing resources that do not need to work may be powered off or put in dormancy.

Figure 5:
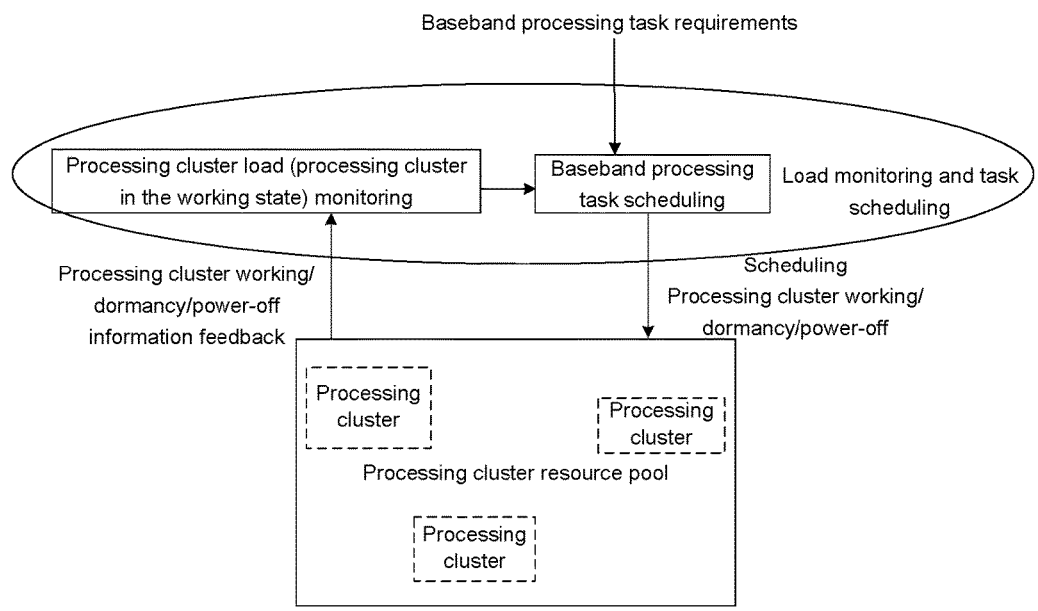
FIG. 5 is a diagram of working principles of a load monitoring and task scheduling component provided by an embodiment of the present disclosure.

FIG. 5 shows a diagram of working principles of a load monitoring and task scheduling component provided by an embodiment of the present disclosure. As shown in FIG. 5, the load monitoring and task scheduling component includes a processing cluster load (a processing cluster in a working state) monitoring component, a baseband processing task scheduling component and a processing cluster resource pool component. The processing cluster load (a processing cluster in a working state) monitoring component is configured to provide decision guide for the baseband processing task scheduling component according to a working state of a current processing cluster; the baseband processing task scheduling component is configured to, according to inputted baseband processing task requirements and load working states of processing clusters, integrally optimizing, combining and scheduling processing clusters in the processing cluster resource pool component to enter a working state/exit the working state/to be dormant or powered off, thereby matching a processing capability required by a current baseband processing task, wherein scheduling time granularity of the baseband processing task scheduling component may change as an application scenario changes. For example, the scheduling time granularity is reduced (increased) as the total number of users/total workload changes fast (slowly), which may be determined by modeling and simulation in advance or dynamically adjusted by self-learning/training according to the change of the application scenario.

Wireless baseband processing clusters are not necessarily confined in three groups, i.e. a "powerful" group, a "moderate" group and a "weak" group, and the number of required groups with different processing capabilities may be determined by analyzing/modeling and simulating different applications. Scheduling time granularity for scheduling a baseband processing task may change as an application scenario changes. This section illustrates examples of methods for determining the number of processing cluster groups and the number of processing clusters in each group, and an example that scheduling time granularity for scheduling a baseband processing task changes as an application scenario changes, and so on. The content of the present disclosure will be specifically described by taking a residential area covered by a base station as an example.

Figure 6:
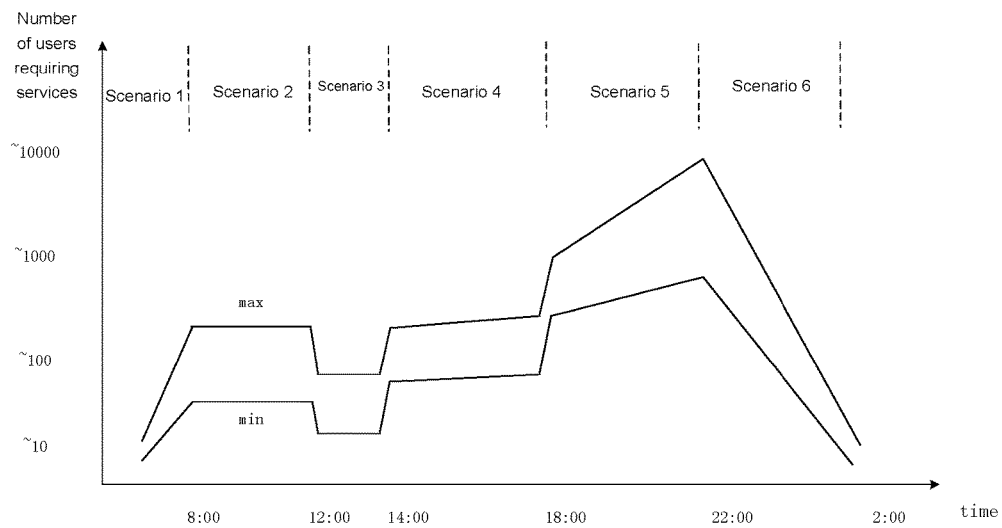
FIG. 6 is a diagram of an analysis curve of the number of users in a residential area according to an embodiment of the present disclosure.

There may be 5 working scenarios according to analysis on the number of users in the residential area, as shown in FIG. 6.

Scenario 1: The number of users increases rapidly, but the total number of users is small.

Scenario 2: The number of users has little change, and there are hundreds of users.

Scenario 3: The number of users has little change, and there are dozens of users.

Scenario 4: The number of users increases rapidly, and there are thousands of users.

Scenario 5: The number of users decreases rapidly, and a large number of users are reduced into a small number of users.

Based on the application analysis above, wireless baseband processing clusters are divided into 2 groups: a group (group 1) of processing clusters for hundreds of users: 50 processing clusters, each of which is able to process about 200 users; and a group (group 2) of processing clusters for dozens of users: 10 processing clusters, each of which is able to process about 10 users.

Combinations are scheduled as follows respectively in the 5 working scenarios.

Scenario 1: Scheduling granularity for scheduling a baseband processing task is extremely small, e.g. scheduling is performed once about every 1 minute. During this period, it only necessary to select several processing clusters (each of which is able to process about 10 users) from group 2 to work while other processing clusters and group 1 are all closed.

Scenario 2: Scheduling granularity for scheduling a baseband processing task is large, e.g. scheduling is performed once about every 10 minutes. During this period, it only necessary to select several processing clusters (each of which is able to process about 10 users) from group 2 or one processing cluster from group 1 to work while other processing clusters are closed.

Scenario 3: Scheduling granularity for scheduling a baseband processing task is large, e.g. scheduling is performed once about every 30 minutes. During this period, only several processing clusters (each of which is able to process about 10 users) are selected from group 2 to work, while other processing clusters and group 1 are closed.

Scenario 4: Scheduling granularity for scheduling a baseband processing task is extremely small, e.g. scheduling is performed once about every 30 seconds. During this period, a plurality of processing clusters (each of which is able to process about 200 users) is selected from group 1, or processing clusters are selected from group 1 or group 2 to match an optimal combination to work, while other processing clusters are closed.

Scenario 5: 4: Scheduling granularity for scheduling a baseband processing task is extremely small, e.g. scheduling is performed once about every 10 seconds. During this period, several processing clusters (each of which is able to process about 200 users) are selected from group 1, or processing clusters are selected from group 1 or group 2 to match an optimal combination to work, while other processing clusters are closed.

Besides a preset method, a working scenario may be also switched dynamically according to a user access request state.

To sum up, the embodiments of the present disclosure have the following technical effect:

the embodiments of the present disclosure put forward a new further developing idea for a piece of wireless baseband processing architecture, and are able to distribute the wireless baseband processing clusters with processing capacities as required, reduce the power consumption of a system, and protect the environment.

Although the present disclosure has been expounded above, the present disclosure is not limited thereto. Those skilled in the art may make various modifications according to the principles of the present disclosure. Therefore, all modification made according to the principle of the present disclosure should be understood as falling into the protection scope of the present disclosure.

What is claimed is:

1. A method for processing a wireless baseband capable of expanding dynamically, comprising the following steps:

pre-constructing a plurality of groups of wireless baseband processing clusters, wherein wireless baseband processing clusters in different groups have different processing capacities and the plurality of groups of wireless baseband processing clusters are independent of each other, each wireless baseband processing cluster is able to complete wireless baseband processing independently, and the wireless baseband processing clusters include: wireless baseband processing clusters subordinate to group categories of wireless baseband processing clusters, and a preset number of wireless baseband processing clusters selected from each group category;

acquiring a current load working state of each group of wireless baseband processing clusters by monitoring the processing loads of the plurality of groups of wireless baseband processing clusters; and according to baseband processing task requirements and the current load working state of each group of wireless baseband processing clusters, scheduling a certain number of wireless baseband processing clusters of which the current load working states are suitable for performing a baseband processing task to enter a working state for performing the wireless baseband processing task, wherein scheduling a certain number of wireless baseband processing clusters of which the current load working states are suitable for performing the baseband processing task to enter the working state comprises:

determining the group categories of wireless baseband processing clusters, and the number thereof according to the baseband processing task requirements;

selecting, according to the current load working state of each wireless baseband processing cluster, the wireless baseband processing clusters of which working states are suitable for performing the baseband processing task from all wireless baseband processing clusters of the determined categories of wireless baseband processing clusters; and scheduling the selected wireless baseband processing clusters to enter the working state.

2. The processing method as claimed in claim 1, wherein the method further comprises: scheduling other wireless baseband processing clusters not performing the wireless baseband processing task to exit the working state.

3. The processing method as claimed in claim 2, wherein the group categories of wireless baseband processing clusters, and the number of wireless baseband processing clusters in each group category are determined according to analysis/modeling and simulation of different applications.

4. The processing method as claimed in claim 1, wherein the group categories of wireless baseband processing clusters, and the number of wireless baseband processing clusters in each group category are determined according to analysis/modeling and simulation of different applications.

5. The processing method as claimed in claim 1, wherein scheduling time granularity of scheduling the certain number of wireless baseband processing clusters of which the current load working states are suitable for performing the baseband processing task to enter the working state for performing the wireless baseband processing task is determined based on change speed of a total number of users or a total workload.

6. A device for processing a wireless baseband capable of expanding dynamically, comprising:

a wireless baseband processing cluster constructing component, configured to pre-construct a plurality of groups of wireless baseband processing clusters, wherein wireless baseband processing clusters in different groups have different processing capacities and the plurality of groups of wireless baseband processing clusters are independent of each other, each wireless baseband processing cluster is able to complete wireless baseband processing independently, and the wireless baseband processing cluster constructing component is further configured to construct the wireless baseband processing clusters when the wireless baseband processing clusters include: wireless baseband processing clusters subordinate to group categories of wireless baseband processing clusters, and a preset number of wireless baseband processing clusters selected from each group category;

a current load working state acquiring component, configured to acquire a current load working state of each group of wireless baseband processing clusters by monitoring the processing loads of the plurality of groups of wireless baseband processing clusters; and a wireless baseband processing cluster working scheduling component configured to schedule, according to baseband processing task requirements and the current load working state of each group of wireless baseband processing clusters, a certain number of wireless baseband processing clusters of which the current load working states are suitable for performing a baseband processing task to enter a working state for performing the wireless baseband processing task, wherein the wireless baseband processing cluster working scheduling component comprises:

a determining unit, configured to determine the group categories of wireless baseband processing clusters, and the number thereof according to the baseband processing task requirements;

a selecting unit configured to select, according to the current load working state of each wireless baseband processing cluster, the wireless baseband processing clusters of which working states are suitable for performing the baseband processing task from all wireless baseband processing clusters of the determined categories of wireless baseband processing clusters; and a scheduling unit, configured to schedule the selected wireless baseband processing clusters to enter the working state.

7. The processing device as claimed in claim 6, wherein the processing device further comprises:

a wireless baseband processing cluster working exit scheduling component, configured to schedule other wireless baseband processing clusters not carrying the wireless baseband processing task to exit the working state.

8. The processing device as claimed in claim 7, wherein the wireless baseband processing cluster constructing component is configured to determine the group categories of wireless baseband processing clusters, and the number of wireless baseband processing clusters in each group category according to analysis/modeling and simulation of different applications.

9. The processing device as claimed in claim 6, wherein the wireless baseband processing cluster constructing component is configured to determine the group categories of wireless baseband processing clusters, and the number of wireless baseband processing clusters in each group category according to analysis/modeling and simulation of different applications.

10. The processing device as claimed in claim 6, wherein scheduling time granularity of the wireless baseband processing cluster working scheduling component is determined based on change speed of a total number of users or a total workload.

* * * * *